US008098618B2

(12) United States Patent
Hundscheidt et al.

(10) Patent No.: US 8,098,618 B2
(45) Date of Patent: Jan. 17, 2012

(54) MULTICAST IN POINT-TO-POINT PACKET-SWITCHED ORIENTED NETWORKS

(75) Inventors: Frank Hundscheidt, Kerkrade (NL); Ralf Keller, Wurselen (DE); Thorsten Lohmar, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1417 days.

(21) Appl. No.: 10/481,078

(22) PCT Filed: Jun. 20, 2002

(86) PCT No.: PCT/EP02/06827
§ 371 (c)(1),
(2), (4) Date: May 5, 2004

(87) PCT Pub. No.: WO03/003650
PCT Pub. Date: Jan. 9, 2003

(65) Prior Publication Data
US 2004/0233907 A1    Nov. 25, 2004

(30) Foreign Application Priority Data
Jun. 27, 2001  (EP) ..................... 01115456

(51) Int. Cl.
  *H04W 4/00* (2009.01)
  *H04B 7/216* (2006.01)
  *H04L 12/66* (2006.01)
  *H04J 3/16* (2006.01)

(52) U.S. Cl. ........ 370/328; 370/335; 370/342; 370/356; 370/392; 370/469

(58) Field of Classification Search .................. None
See application file for complete search history.

(56) References Cited

U.S. PATENT DOCUMENTS

| | | | | |
|---|---|---|---|---|
| 6,331,983 | B1 * | 12/2001 | Haggerty et al. ............. | 370/400 |
| 6,466,552 | B1 * | 10/2002 | Haumont ...................... | 370/310 |
| 6,608,832 | B2 * | 8/2003 | Forslow ........................ | 370/353 |
| 6,763,236 | B2 * | 7/2004 | Siren ............................ | 455/450 |
| 6,996,414 | B2 * | 2/2006 | Vishwanathan et al. ...... | 455/518 |
| 7,023,820 | B2 * | 4/2006 | Chaskar ........................ | 370/329 |
| 7,068,680 | B1 * | 6/2006 | Kaltenmark et al. ......... | 370/469 |

* cited by examiner

*Primary Examiner* — Melanie Jagannathan

(57) ABSTRACT

The invention relates to a method, network node, router, serving node and system for performing multicast in a point-to-point packet-switched oriented telecommunication network. The basic idea is to introduce pre-configured multicast transmission for parts of a network. This is done by creating pre-configured transport multicast group tunnels between a router and a serving node in order to transport the multicast data. Further the present invention describes the possibility of multiplexing of the multicast data streams on a pre-configured transport multicast group tunnel. In particular the invention is applicable for multicasting in networks, like UMTS with a scarce number of resources, in the IP network between the SGSN and GGSN for example on the Gn interface.

26 Claims, 9 Drawing Sheets

Figure 1:
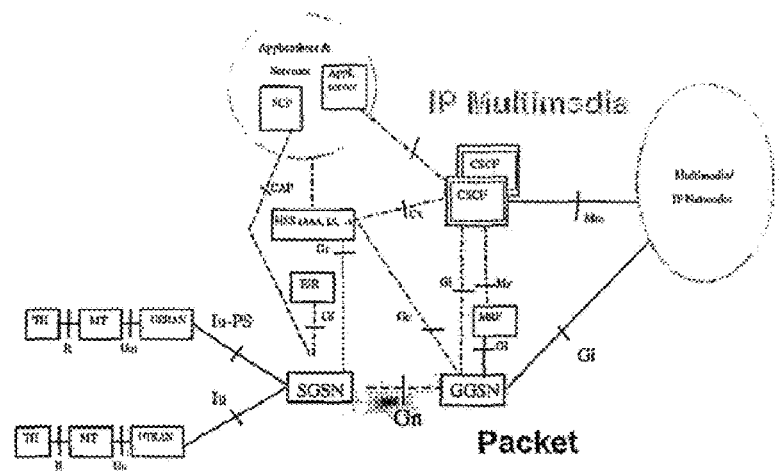

2 IP Layers in All-IP Networks:

Application-level; IP e2e between terminals or between terminals and application servers.

Transport level: IP serves as the transport technology, or connectivity, between network nodes.

QoS Based Multicast Delivery Trees

QoS Based Multicast Delivery Trees

GGSN

| TLMG | Service Class | MC-Address | #MSes |
|---|---|---|---|
| tlmg1 | conversational | mc1 | 2 |
|  |  | mc2 | 3 |
| tlmg2 | streaming | mc3 | 1 |
|  |  | mc4 | 1 |
| tlmg3 | interactive | mc5 | 3 |
|  |  | mc6 | 7 |
| tlmg4 | background | mc7 | 2 |
|  |  | mc8 | 0 |
| tlmg5 | conversational | mc9 | 4 |
| tlmg6 | streaming | mc10 | 2 |
| ... |  |  |  |

SGSN

| TLMG | (Service Class) | MC-Address | MS |
|---|---|---|---|
| tlmg1 | conversational | mc1 | ms1, ms2 |
|  |  | mc2 | ms3, ... |
| tlmg2 | streaming | mc3 | ms1 |
|  |  | mc4 | ms6 |

Change of SGSN (Alt. 1)

Change of SGSN (Alt. 2)

MULTICAST IN POINT-TO-POINT PACKET-SWITCHED ORIENTED NETWORKS

TECHNICAL FIELD

The present invention relates to a method, network node, router, serving node and system for performing multicast in a telecommunication network.

Especially is the present application applicable in a point-to-point packet-switched telecommunication network.

BACKGROUND

Multicasting is a service that permits sources to send a single copy of the same data to an address that causes the data to be delivered to multiple recipients. Under multicasting only one copy of a message passes over any link in a network and copies of the message are made only where paths diverge. From the network perspective, multicast dramatically reduces overall bandwidth consumption, since the data is replicated in the network at appropriate points rather than in the end-systems. Further a server, which is sending multicast message needs to manage only one session.

Local area networks have supported multicasting for many years. For networks, where nodes share a common communication medium multicasting is easy to support. A specially addressed packet can be read off the communication medium by multiple hosts.

Extending multicasting capabilities to internetworks however led to the introduction of a router at the edge of a network in order to figure out dynamically how to forward the arriving data packets. The way of forwarding is for example derived from the address included in the header of the data packet and from the routing table, which is administrated in the router. There are few possibilities of performing the multicast addressing, for example to use the address indicating the multicast group.

In case the multicast is used in Internet Protocol IP network then it is called IP multicast. Within the IP multicast the membership of a multicast session group is dynamic, which means that the hosts may join and leave groups at any time. In order to allow hosts on networks to indicate whether they wish to join or leave a particular multicast group there is a protocol called the Internet Group Message Protocol IGMP. Thus this protocol lets the system know which hosts currently belong to which multicast group. This information is required by the multicast routers to know which multicast data packet is to be forwarded onto which interface.

The IGMP is a part of the IP layer and the IGMP messages are transmitted in IP data packets. The version 1 of IGMP is described in RFC 1112 "Host extensions for IP multicasting" S. E. Deering, Aug. 1, 1989. RFC 2236 "Internet Group Management Protocol, Version 2" W. Fenner, November 1997 describes the version 2. The IGMP has been developed for IP version 4. In Internet Protocol IP version 6 there is a similar protocol called Multicast Listener Discovery MLD, which is used for the same purpose as the IGMP. The description of the first version of MLD can be found in RFC 2710 "Multicast Listener Discovery (MLD) for IPv6" S. Deering, W. Fenner, B. Haberman, October 1999. However the messages used in MLD correspond to the IGMP messages. In the following the IGMP will be used as an example. Although this should not be restricted to the IGMP, the functionality of the invention is also given by usage of MLD.

In principle the IGMP uses two basic messages to fulfil its tasks, the membership report and the membership query message and the following rules are applied. The different versions of IGMP contain also additional messages.

A multicast router sends a membership query at regular intervals to see if any host still belongs to any group. The router must send one query out each interface. The group address in the query is 0 since the router expects one response from a host for every group that contains one or more members on each host. It is also possible to send a membership query for one particular group rather than for all groups. A host responds to an IGMP query by sending one IGMP report for each group that still contains at least one user. A host joins a group also by sending the membership report.

Using the information received by applying the report and the query messages a table with its interfaces having at least one host in a multicast group is established. The router forwards the received multicast data out the interface, which has at least one member.

With the IP multicast the receivers do not need to know who or where the senders are to receive traffic from them and the senders do not need to know who the receivers are. Neither senders nor receivers need to care about the network topology as the network optimises delivery. The distribution of the information via the IP multicast is performed on the base of a hierarchical connection of the hosts, like for example a multicast delivery tree. Several algorithms have been proposed for building multicast distribution trees, like for example spanning trees, shared-trees, source-based trees, core-based trees. The descriptions of the corresponding algorithms can be found in "IP telephony: Packet-based multimedia communications systems" O. Hersent, D. Gurle, D. Petit, Addison-Wesley, Harlow, 2000. After the establishment of the multicast delivery tree, the distribution of the information is done by the IP multicast routing protocols. The detailed description of the corresponding IP multicast routing protocols can also be found in the above-mentioned document.

An advantage of the IP multicast is the support of the heterogeneous receivers. With IP multicast it is possible to send different media to different multicast groups and the receivers decide which media to receive in dependence on the own capability and/or preferences. Similarly, if a sender layers its video or audio stream, different receivers can choose to receive different amounts of traffic and hence different qualities. To do this the sender must code the video as a base layer it means with the lowest quality that might be acceptable and a number of enhancement layers, each of which adds more quality at the expense of more bandwidth. With video, these additional layers might increase the frame rate or increase the spatial resolution of the images or both. Each layer is sent to a different multicast group and receivers can individually decide how many layers to subscribe to and consequently to receive.

Multicasting in the internetworking between a fixed network and a mobile network like, General Packet Radio System GPRS or Universal Mobile Communication System UMTS causes some further problems. The impacts on the problems have for example the mobility of the end users and the low transmission bandwidth of the mobile network on the air interface. Further the communication in a mobile communication networks like for example in UMTS is a unicast communication. The unicast communication is also called point-to-point communication. The point-to-point communication means sending of a message from a single sender to a single receiver. In such kind of network, in particular in the core network it is not foreseen to perform a multicast communication. The group communication is implemented by means of a point-to-point communication having a sender transmitting separately packets to each member of the group.

For a group with n members, n packets are required on the whole way between the sender and the receivers, instead of one packet when multicast transmission is used.

In order to explain the problem occurring in a point-to-point oriented telecommunication system in the following an overview of the architecture of the General Packet Radio System GPRS network is given.

The GPRS is the packet-switched enhancement of the Global System for Mobile Communication GSM, which is a circuit switched network. It means that the user can be permanently online connected but has to pay only for the real data transfer. In order to fulfil the new requirements some changes are introduced into the GSM inter alia new logical nodes, the Serving GPRS Support Node (SGSN) and the Gateway GPRS Support Node (GGSN) are introduced. The main functions of the GGSN involve interaction with external IP packet networks providing for example connections to Internet Service Providers ISPs. From the external IP network's point of view, the GGSN acts as a router for the IP addresses of all subscribers served by the GPRS networks. The GGSN also exchanges routing information with the external network. The SGSN serves all GPRS subscribers that are physically located within the geographical SGSN service area. It forwards incoming and outgoing IP packets addressed to or from a mobile station. Additional to the new logical nodes also new interfaces between the nodes are to be defined. For the invention in particular the Gn, Gi, Gp interfaces are relevant. The Gp interface is defined between GGSN nodes belonging to different operators. The Gn interface defines the IP based backbone between the SGSN and GGSN. The Gi is the interface between GGSN and a further network, like Internet. The restriction of GPRS is that GGSN and SGSN are to be connected in a way that IP is run on top of the technology chosen, meaning that SGSN and GGSN communicate via IP addresses. A detailed description of the architecture is to be found in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998).

The similar nodes and interfaces are also used in the next generation of the wireless networks, in UMTS as described in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999). In order to distinguish between the functionality of these nodes in UMTS extended names are often used, 3G-SGSN and 3G-GGSN. In the following description it will not be distinguished between the GPRS and UMTS nodes.

In the following an overview of an UMTS network, as specified in the 3GPP specifications, UMTS Standard 23.060 as mentioned above, in respect to FIG. 1 is given.

The FIG. 1 shows the core network as packet switching domain, indicated as Packet. The core network is connected to a radio network, depicted as Radio NW. On top of the packet switching domain of the core network, there is the IP Multimedia Subsystem (IMS), IP Multimedia for conversational multimedia services. Each of the subsystem includes the corresponding nodes. Relevant for the present invention are the nodes of the core network, the SGSN and the GGSN node with the involved interface Gn, Gi, which will be further described in more detail. The also relevant Gp interface is not depicted in FIG. 1. IMS as an example uses the packet switching domain to provide bearers for the conversational multimedia services. Streaming multimedia services are also possible without IMS by using for example a streaming server in the Internet on top of a corresponding packet switched bearer.

With the introduction of streaming and conversational multimedia services, many new point-to-multipoint services will evolve. These will have high demands on the network infrastructure and consume considerable amounts of bandwidth. Some examples of such services are video-conferencing, whiteboarding, real-time multi-user games, multimedia messaging, virtual worlds.

According to FIG. 1 an external IP network, like the Internet is depicted as Multimedia/IP Network, the mobile station as TE and the core network as Packet. Currently the IP multicast messages in the UMTS are sent from a router settled in an external IP network transparently to the mobile station via a unicast connection. As already mentioned the multicast is performed on the IP layer and from the view of the mobile station TE the router in the Internet is the first node in which the IP connection terminates and therefore the first node applicable for the multicast. It means the IP layer in the GGSN, which allows the communication to the external networks, is currently not seen as capable for performing multicast. The router sends multicast messages within the core part of the mobile network without distinguishing between a multicast message and a unicast messages. The separation of the multicast flows is already done in the router in the Internet and the same data packets are sent over the wireless network multiple times depending on the number of recipients.

It means the existing UMTS technology does not foresee the utilisation of efficient multicasting on the part of the network denoted by the Gn interface in the FIG. 1. Any service that is simultaneously provided to multiple clients is replicated at the edge of the wireless network and multiple unicast connections are used towards the clients. Especially with the evolution of resources high-demanding streaming or conversational multimedia services this implies that the resources in the network are used very inefficiently.

Further the existing nodes are not prepared for performing a multicasting.

In general introducing and performing of multicast in a network, that is basically point-to-point oriented causes problems, than in such kind of networks a unicast channel is established for performing a communication between two nodes. It means the problem does not only occur in a wireless network like UMTS.

Further examples of protocols being multicast capable, are SIP (session Initiation Protocol) or RTSP (Real-time Streaming Protocol). The SIP protocol is described in Multiparty Multimedia Session Control (MMUSIC) WG in IETF, and the RTSP is covered by RFC 2326 Real Time Streaming Protocol (RTSP) H. Schulzrinne, A. Rao, R. Lanphier, April 1998. These protocols belong also to point-to-point oriented protocols and the following invention applies also for them.

SUMMARY AND DESCRIPTION OF THE INVENTION

It is an object of the present invention to provide a solution for an efficient introduction and performing of the multicast in a point-to-point oriented packet-switched telecommunication network.

The invention is embodied in a method, router, serving node and system as disclosed in claims 1, 24, 26 and 27. Advantageous embodiments are described in the dependent claims.

The basic idea is to use default, pre-configured and pre-established multicast transmission to multicast groups for parts of a point-to-point oriented packet-switched telecommunication network, like for example UMTS, having at least one router, for example a GGSN and at least one serving node, for example SGSN handling at least one user, like for example a mobile station. Said network can provide multicast groups by itself. It can be also connected to a further network, like for example to the Internet, having multicast groups to which it is possible to register. A pre-configured transport level multicast group tunnel is pre-established by means of a transport layer protocol for tunnelling, like for example a GTP, between the router and the serving node and said tunnel is assigned to a multicast group. The router has the possibility to multiplex multiple multicast data streams onto the pre-configured transport level multicast group tunnel in case said streams match with the pre-configuration of the tunnel. The transmission of multicast data is carried out over the pre-configured transport level multicast group tunnel from the router to the serving node. If necessary de-multiplexing of the multicast data in order to forward the data to the users registered to the corresponding multicast group is performed in the serving node.

The serving node performs also a replication of the multicast data streams in case there is more then one user registered to the multicast group and chandelled by the serving node.

In the further description a mobile station as an example is used to describe the user. However also a node can be seen as a user. In general the user means a multicast group member.

In a preferred embodiment of the present invention the pre-configuration of the transport level multicast group tunnel is done according to different service classes. For example in UMTS different service classes exist, like streaming or conversational service classes, which have different requirements on the Quality of Service QoS. According to these requirements a pre-configured transport level multicast group tunnel supporting the required QoS requirements can be established. In an advantageous embodiment of the method more than one pre-configured transport level multicast group tunnels are established for load balancing and redundancy purposes. This means that combination of the pre-configured transport level multicast group tunnel and the service classes can be built. For example two pre-configured transport level multicast group tunnels can be established for a streaming service class.

In another embodiment the pre-configured transport level multicast group tunnel can be established according to another parameter, which is geographical region, like for example a city or a land. Areas covered by for examples one or more serving nodes, like SGSN or one or more routers, like GGSN, can also define a geographical region. Further combinations of the parameters can be defined. For example for specific geographical regions a number of pre-configured transport level multicast group tunnels can be established with different service classes.

Preferably the serving node informs the router about their interest for connection or release to or from a transport level multicast group. The transport level multicast group relates to multicast group, to which a user can register. The multicast transmission to the members of the transport level multicast group is performed over a pre-configured transport level multicast group tunnel.

It is also possible that the router takes care for the establishment of the pre-configured transport level multicast group tunnel to a serving node. This is done by means of an administration interface. This can be done during the start-up procedure, when a serving node is being connected to the network. The router receives the parameters of the serving node and according to these parameters a transport level multicast group tunnel is established.

The pre-configured transport level multicast group tunnels use a pre-configured multicast delivery tree, which is created between the router and at least one serving node. Said tree is established by means of multicast routing protocols.

Multicast groups require QoS characteristics that are provided by a corresponding service class in order to send their traffic on top of the multicast tunnel of that service class. In this relation it can be said that a multicast group belongs to a service class. In a preferred embodiment of the present invention multiplexing of multiple multicast groups, which belong to the same service class is performed onto the same transport level multicast group tunnel, which was pre-configured in order to support said service class.

For the purpose of the administration of the pre-configured transport level multicast group tunnel a data structure is foreseen. The task of the data structure is to administrate the association between the pre-configured transport level multicast group tunnels, the registered user for the multicast group and a multicast address of the multicast group. Said data structure can be either centralised in a network node or distributed within the network.

In particular this means that the data structure can be administrated in the router and/or in the serving nodes or by one or multiple other network entities.

In a preferred embodiment of the invention the data structure includes the relation between the pre-configured transport level multicast group tunnel and the service class in order to decide to which pre-configured transport level multicast group tunnel a user requesting for a specific service class should be assigned.

In a preferred embodiment of the invention the serving node collects statistics about the number of multicast data packets that they relay towards users and the number of multicast data packets that they discard and according to the result a decision is taken to de-register from a transport level multicast group. Based on this information the serving node may decide to de-register from the TLMG, since it requires more processing capacity from the serving node to discard multicast traffic than is gained from the multicast.

In a preferable embodiment of the invention the serving node decides whether it wants to be a part of a pre-configured transport level multicast group tunnel or not. In order to find out to which serving nodes the multicast data are to be sent it is preferable to administrate the number of serving nodes, which are registered to a pre-configured transport level multicast group tunnel. However the router can also just send the data to the transport level multicast group tunnel without knowing how many and which serving nodes are connected to the corresponding transport level multicast group.

In a preferred embodiment the multiple multicast data streams are multiplexed onto a pre-configured transport level multicast group tunnel. In order to de-multiplex the receiving multiplexed multiple data streams, the serving node administrates the parameter distinguishing the streams in order to determine the users that are part of the multicast group. This could be for example the multicast address of the multicast group existing in the further network, which consequently is to be sent to the serving node included in the data packets.

In order to perform the method according to the invention the registration and de-registration procedure is to be defined. In a preferably embodiment in order to perform the registration or de-registration of a user to or from a multicast group, the user informs the router, the router informs the serving node and an updating of the corresponding entries in the data structure is performed.

The mobile networks are in particular characterised by the movement of the users. Therefore a procedure is to be applied, which guarantees a continuously receiving of data. For this purpose in case the user changes the serving nodes, a registration of the user to the new serving node, a deleting from the old serving node and update of the corresponding entries in the router are performed.

For this procedure a control signalling protocol is to be used for the purpose of signalling message exchange. Also the transport layer protocol for tunnelling, which is used for the establishment of the pre-configured transport level multicast group tunnel is an example of the said protocol.

An example of said control signalling protocol is the GPRS Tunnelling Protocol GTP as used in UMTS.

In an advantageous embodiment of the present invention the GTP Tunnelling ID TID as defined in GTP can be used as the distinguishing parameter for de-multiplexing of the multicast streams in the serving node instead of the multicast address of the multicast group.

In a preferred embodiment of the invention the multicast is an IP-multicast using IP packets with IP multicast address in order to define the route to the users according to a multicast routing table included in a multicast capable router.

It is also preferably to use the existing IGMP or MLD protocol for the registration to and for the release from a multicast group. These are well known protocols, which in a preferred embodiment of the invention are modified in order to save network resources. This means that currently the router asks the users by means of the IGMP request message about the readiness to register to a multicast group. This IGMP membership query is sent periodically. In order to save the transmission resources it is more efficient that the user registers to a multicast group in case it wants to.

It is proposed to adapt a router to perform multicast transmission within a telecommunication network. The router has logic for establishment of a pre-configured transport level multicast group tunnel towards the serving nodes. Further the router includes logic for multiplexing of multiple multicast data streams onto the pre-configured transport level multicast group tunnel in case the multicast data streams match with the pre-configuration of said tunnel. The router has also logic for transport the multicast data over the pre-configured transport multicast group tunnels to the serving nodes. This includes receiving of the multicast data for example from the further network, analysing the address of the receiver, the translation of the address into the identifier of the pre-configured transport level multicast group tunnel and sending the multicast data to this tunnel.

It is proposed that the router contains also logic for propagation the multicast registration to the further network. The propagation is required, when the user is the first one registering to a multicast group. This implies the necessity of informing the neighbouring routers in the further network that there is at least one member of the particular multicast group to whom the multicast data of the corresponding group are to be sent.

It is proposed that the router controls a data structure for the administration of the relation between the pre-configured transport level multicast group tunnels, the registered users for the multicast group and the multicast address.

Further a serving node is adapted to perform multicast within a telecommunication network. The serving node has logic for receiving multicast data from the router on the pre-configured transport multicast group tunnel. Logic for administration of the pre-configured transport level multicast group and of the users registered to the corresponding multicast group. This is required in order to know to which user the multicast data received from a pre-configured transport level multicast group tunnel are to be sent. Further the serving node needs logic for de-multiplexing in case multiple multicast data streams are multiplexed onto the pre-configured transport level multicast group tunnel. In case there are more then one user the multicast data are replicated by logic for replication of the received multicast data among the users.

Further it is proposed to have a system adapted to perform a multicast within a telecommunication network with a router and a serving node handling users, wherein the above-described features enhance the functionality of the nodes and the system works according to the above-described method.

In a mobile environment like in UMTS the idea could be implemented by using IP multicast for efficient transmission in the IP network between the SGSN, which is an example of a serving node and the GGSN, which is an example of a router.

An advantage of the invention is to provide efficient utilisation of scarce and expensive network resources in wireless networks.

Further in case of GPRS or UMTS efficient transmission on the Gn and Gp interface is achieved by transmitting only a single copy of a packet on each link. This reduces the overall transmission resources and limits the need for congestion prevention, load-balancing algorithms, when multiple users for the same multicast group are located in the same or different SGSNs.

Using the pre-configured multicast transmission for parts of a network, like for example the pre-configured transport level multicast group tunnels reduces the set-up times for multicast groups since no multicast delivery trees must be established when a user registers or de-registers to or from specific multicast groups or when users change their serving SGSN. Furthermore, by using the pre-configured transport level multicast group tunnels an enhanced service provisioning and multiplexing of different multicast groups on the same pre-configured transport level multicast group tunnel is achieved.

In the following the transport level multicast group, which is assigned to a pre-configured transport level multicast group tunnel will be called TLMG.

In the following a detailed description of the invention is given.

FIG. 1: Packet-switched domain in a UMTS network and in addition the radio networks and the IP multimedia subsystem, FIG. 2: Network related view of the basic idea of the invention, FIG. 3: Overview of the protocol stacks used for the UMTS userplane, FIG. 4: Protocol related view of the basic idea of the invention, FIG. 5: Basic idea of the invention showing the pre-configured transport level multicast group tunnel, FIG. 6: Basic idea of the invention showing multiplexing on the pre-configured transport level multicast group tunnel, FIG. 7: Data structure for administration for the entries according to the invention, FIG. 8: Pre-configured TLMG Establishment procedure, FIG. 9: Pre-configured TLMG Release procedure, FIG. 10: Multicast Group Registration procedure, FIG. 11: Multicast Group De-Registration procedure, FIG. 12: PDP Context De-Activation, FIG. 13: First alternative for performing the procedure of changing SGSN, FIG. 14: Second alternative for performing the procedure of changing SGSN, FIG. 15: Third alternative for performing the procedure of changing SGSN, FIG. 16: Multicast data delivery tree.

Figure 2:
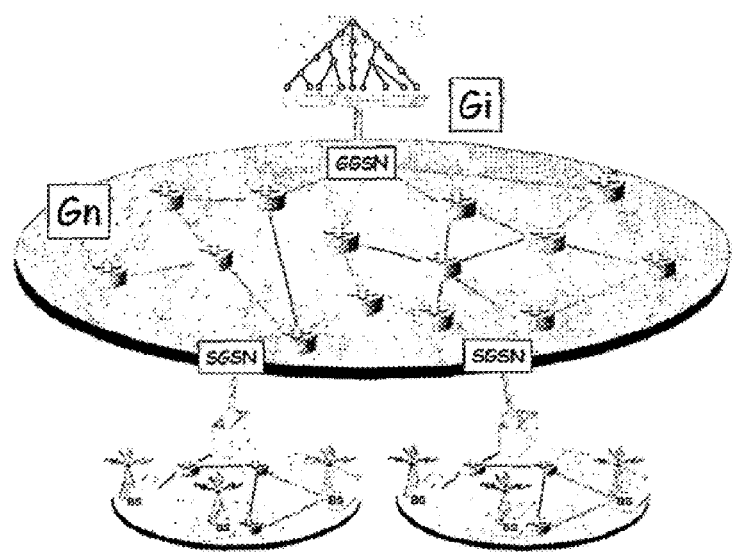
Figure 3:
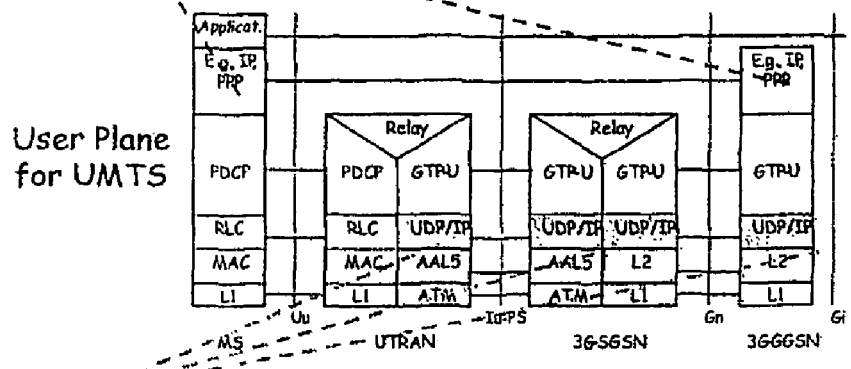

In the following a description with respect to FIGS. 2 and 3 is given.

The upper part of FIG. 2 with the tree structure depicts multicast within an external IP network. The IP network is connected to a GGSN via a Gi Interface. The transmission from the GGSN to the SGSN goes via the Gn interface, wherein the transmission can go via a number of nodes. This is shown in FIG. 2 by the middle part having nodes connected. The lower part depicts the different radio networks, which are served by the corresponding SGSN. The most important part of the figure is the middle part of the network, the Gn-interface where multicasting is applied to forward traffic from the GGSN to two SGSNs that propagate the traffic to the corresponding radio access networks.

A protocol related view is reflected in the FIG. 3. The FIG. 3 shows architecture of a network as standardised in 3GPP. However this should not be seen as a restriction for the invention. The FIG. 3 shows a mobile station MS, which communicates over the Uu interface with an access network UTRAN. The Tu-PS interface connects UTRAN with 3G-SGSN, which communicates over the Gn interface with the 3G-GGSN. The FIG. 3 provides an overview of the different protocol stacks in the different nodes used in UMTS. The following description concentrates merely on the two IP layers in the packet switched domain, depicted as for example IP, PPP and UDP/IP, and on the GTP-U layer. In the FIG. 3 the other protocols are mentioned due to the complementary reasons.

The above-mentioned requirements and restriction for the functionality and communication manner of the introduced packet switched oriented nodes like SGSN or GGSN have their impact on the developed protocol stacks. As a result of the function of the GGSN as a router and as an interface to the external networks, the IP layer below the application layer has been introduced. Further due to the restriction of having an IP network between the GGSN and the SGSN, an IP logical connection is introduced as a transport mean below the GTP-U layer.

Therefore in respect to the FIG. 3 there are two IP layers, in the following described as an application IP and a transport IP layer. The application IP layer in the protocol stack is located directly below the application protocols, Applicat., connecting the mobile station and the 3G-GGSN. This IP layer is transparent to the packet switching network. That is depicted in the FIG. 3 by a direct line going from the MS to the 3G-GGSN. The second IP layer is the transport IP layer used for the transmission between the SGSN, GGSN and UTRAN. The payload traffic is transported across the Gn and Iu-PS encapsulated in an application-specific tunnelling protocol, the GPRS Tunnelling protocol GTP, which is an example of a transport layer protocol for tunnelling. In GPRS the GTP protocol is only used between the SGSN and GGSN. The GTP packets use the UDP as a transport protocol. However there are different tunnelling protocols, which are responsible for building a tunnel. The GTP is merely an example.

Figure 4:
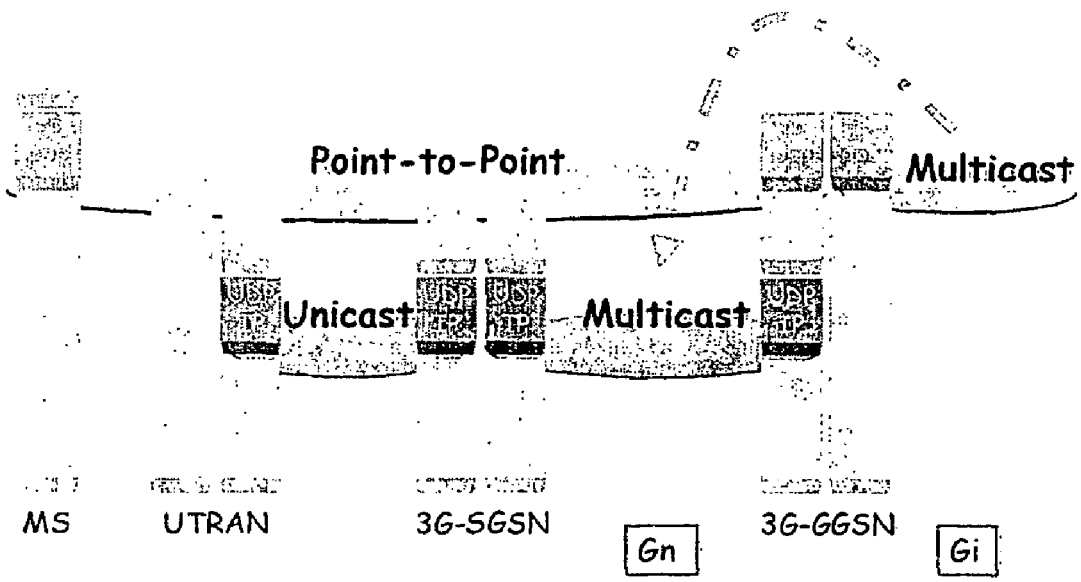

The introduction of the multicast in a point-to-point oriented packet-switched network is presented in respect to FIG. 4. It shows a mobile station MS with an Application layer, Appl., on the top of the protocol stack and with an Internet Protocol IP or with Point to Point Protocol PPP on the network layer. The lower layers are depicted as L1 and L2 layers, because they can differ in the corresponding nodes in dependence on the underlying physical network. The logical IP or PPP connection from the mobile station terminates in the 3G-GGSN. Between the UTRAN, the 3G-SGSN and 3G-GGSN the GTP-U protocol for building a tunnel between these nodes is used. Below the GTP-U an IP layer with UDP as a protocol for transport of the payload information is located.

The idea is to introduce the multicast functionality on the IP layer below a tunnelling protocol, like for example GTP. In FIG. 4 the cloud between the 3G-SGSN and 3G-GGSN depicted as Multicast shows the idea. The arrow going from the Multicast cloud on the Gi interface to the Multicast cloud on the Gn interface shows the introduction of the multicast performed on the application IP layer to the transport IP layer. It means the multicast data arriving to the 3G GGSN over the Gi interface are redirected to the lower IP layer, which performs the multicast between the GGSN and the SGSN. The connection between the SGSN and the RNC in UTRAN remains unicast. Also the logical point-to-point connection on the IP layer is left.

In the following the enhanced functionality of the GGSN is described, which is required in the present invention.

In order to fulfil the new tasks the GGSN has to act as a local multicast router, which is able to handle IGMP or MLD message arriving from the subscribers. The GGSN terminates the IGMP or the MLD messages and propagates the relevant information via IGMP or MLD towards the neighbouring routers. The GGSN also handles the multicast routing protocols. The subscribers register for specific multicast groups in the GGSN and the GGSN keeps track of the active multicast groups in the packet switched network. So far, the GGSN acts very much like a standard local multicast router. In general a Public Land Mobile Network PLMN external local multicast router may be used instead of the GGSN itself.

Additionally, the GGSN pre-establishes a pre-configured multicast group in the scope of the core network. In fact a source based multicast tree is created between the GGSN and all affected nodes, like SGSNs on the transport layer. Preferably IP multicast is used to deliver the data to the SGSNs upon which the SGSN replicates the packets and forwards these to the mobile stations concerned. In a possible case, in which the present application is used on the interface between the SGSN and the RNCs connected to the SGSN, it is the RNC that replicates the packets. The mentioned multicast group is further described as so called pre-configured Transport Level Multicast Group TLMG.

Figure 5:
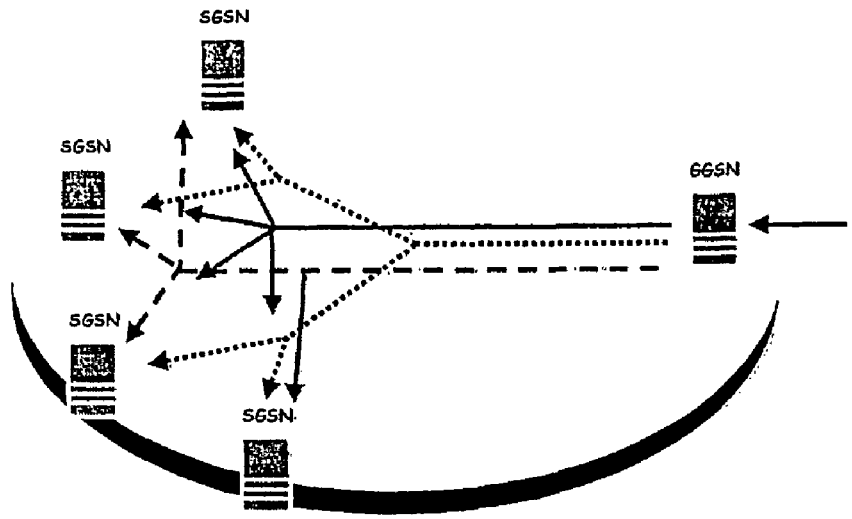

The basic idea of the present invention is disclosed in respect to FIG. 5.

FIG. 5 shows a GGSN, which communicates with four SGSNs over the different configured connections. Between the GGSN and SGSNs pre-configured TLMGs are pre-established. The different dotted lines show the different pre-configured TLMGS. The TLMG has the scope of the core-network it means they go between SGSN and GGSN. The TLMGs are used to transport multicast traffic received on the Gi-interface via the Gn-interface to the SGSNs. The TLMGs can be based on different service classes, like for example on different Quality of Service QoS parameter, transporting optionally multiplexed multiple multicast streams. In the SGSN the stream is de-multiplexed and replicated, if necessary, and for example a unicast transmission is used between the SGSN and the MS. Since the TLMGs are pre-established, the TLMG establishment does not additionally delay multicast group registrations between the GGSN and affected SGSNs.

The concept of pre-configured TLMGs can also be used for operation and maintenance or configuration messages between network entities.

In the following a preferred embodiment of the invention is given. It describes multicasting on the Gn-interface. It means between the GGSN and SGSNs. Similar mechanisms can be used to apply transport-level multicast to other point-to-point networks, which are for example based on Real-time Streaming Protocol RTSP or Session Initiation Protocol SIP. Further the same mechanism is applicable for the Gp-interface, which is between the GGSN and an SGSN located in another PLMN.

The SGSNs use IGMP to inform the corresponding GGSN about their interest for a specific TLMG. In an alternative solution the GGSN administers the SGSNs that are to be connected to the TLMG. The administrations, which can be done in the GGSN and/or in SGSNs, are controlled by administration interfaces. The administration interface can be for example an Operation and Maintenance O&M interface, as it is known in the network administration. An operator can for example set up the configuration of SGSN and after the start up of the operation the GGSN pre-establishes pre-configured TLMG, wherein the pre-configuration corresponds to the requirements of the SGSN. Changes to the pre-configuration of the SGSN can be also done by means of the administration interface. The pre-configured TLMG can be established by means of the routing protocols. Then the multicast routing protocols are used to establish a multicast delivery tree with the GGSN as root and the SGSNs as leafs.

Since different service classes are used in the UMTS network, for example conversational or streaming service, a TLMG may be created per service class. The multicast routing protocols consider the required Quality of Service QoS while establishing the corresponding multicast delivery tree. Multiple TLMGs can also be created per service class to provide load-scheduling means.

The TLMGs can be pre-configured via an administration interface to use differentiated service CodePoint or Type of Service (ToS) setting, which is associated with the UMTS Bearer class and used for the routing of the corresponding IGMP messages and the establishment of the multicast delivery trees.

Figure 6:
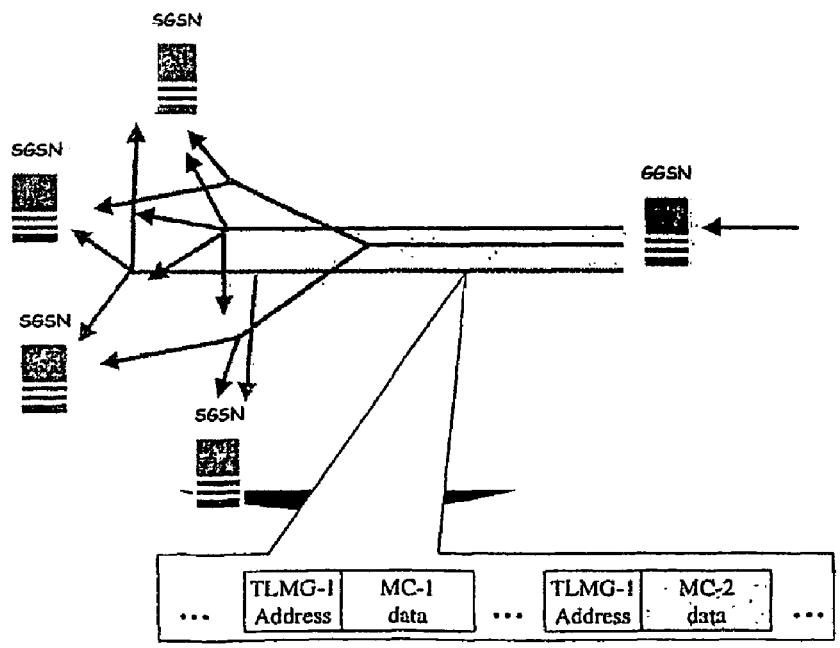

The result is a multitude of service class based multicast delivery trees between the GGSN and all connected SGSNs, as shown in the FIG. 6.

The FIG. 6 shows three different multicast delivery trees based on QoS routing. In FIG. 6 this is depicted by the different dotted lines between the GGSN and the SGSNs. The tree structure is different, since the QoS metrics or service classes are taken into account for the establishment of the tree. On each link several multicast groups may be multiplexed. This means multiple multicast groups are transported on the same TLMG, as long as they have the same QoS requirements that are fulfilled by the TLMG. In FIG. 6 this is depicted by the multicast data streams MC1-data and MC2-data, which are multiplexed on the same pre-configured TLMG. This is depicted by the same TLMG address, TLMG1-address.

Figures 7, 8:
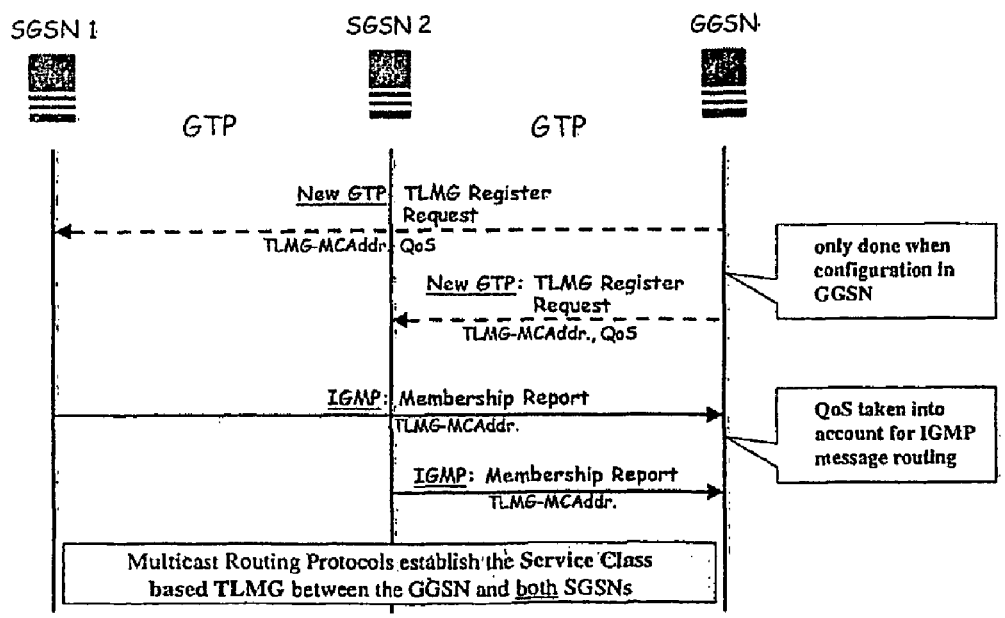

The FIG. 7 shows a data structure as it is used in the signalling scenarios below. In general, the data can be centralised or distributed in any way and the information transfer between the different network entities is adapted accordingly.

The FIG. 7 shows the node SGSN and the node GGSN with the actual entries. The GGSN has currently six TLMGs, tlmg1 to tlmg6. A TLMG is assigned to a service class like for example streaming or interactive, which are listed in the Service Class column. Since a service class can be supported by different tlmgs this can lead to different combinations. In the following this is called TLMG/Service Class combinations. The MC-address column includes the multicast addresses, mc1 to mc10 of the multicast group in the further network, which relates to ascertain tlmg. For example the multicast addresses mc1 and mc2 are assigned to tlmg1. This means that the multicast data streams with the multicast address mc1 and mc2 are multiplexed on the tlmg1. Further the number of users is administrated in the column #MSes to keep track of the number of users per multicast group or adequate per TLMG, in the following this relation is abbreviated as multicast group/TLMG. In order to know whether a user belongs to a multicast group/TLMG at a change of the SGSN or a deletion of the PDP context, the GGSN may additionally store the users per TLMG. Another solution is to store in the GGSN indicators, like for example the TLMG multicast addresses for the PDP-contexts of a user that has registered for one or more multicast groups. A user may have multiple PDP contexts active and for each of the active PDP contexts the user may register to one or more multicast groups. This implies that the PDP context data could be extended with an additional identifier for the multicast groups that the user has registered to. The PDP context activation is like logging on the external IP network. For this aim a mobile subscriber identity is associated with an IP address. During the PDP Context Activation a tunnel with an identity, in the following identified with TID is created between the SGSN and GGSN for the PDP context. In case the GTP is used during the PDP Context Activation a GTP tunnel is established. During this procedure also a Quality of Service QoS negotiation takes place between the MS and the SGSN/GGSN.

The SGSN administrates similar entries as the GGSN, TLMG, Service Class, MC-Address and #MSes. In order to distinguish the multicast data streams and to perform de-multiplexing of the streams, it is required to administrate the multicast address and its relation to the TLMG in SGSN. In the SGSN the column #MSes includes the list of users belonging to a tlmg in order to sent the multicast data to the specific mobile stations.

In the following a TLMG, which is pre-configured according to the requirements of a service class will be called Service Class based TLMG. The Service Class based TLMG may be administered in the GGSN or in the corresponding SGSNs. In case the configuration of the TLMG is done in the GGSN, the TLMG/Service Class combinations are administered. Since not all SGSNs must be part of the TLMGs, because for example a SGSN does not have any users, which have registered to a multicast group, in this case it can be decided to remove the SGSN from the TLMG. This is the reason why the registered SGSNs must be administered as part of the TLMGs in the GGSN too. Optionally, the GGSN includes a counter per TLMG for the number of SGSNs that have at least one multicast group member that is served by the TLMG. This number of SGSNs may then be taken into account to decide upon reception of multicast data whether multicasting via the TLMG is efficient or not. This will depend on the relation between the number of SGSNs that have group members and the number of SGSNs without group members that will have to do an additional processing just to discard the multicast traffic. Then when a SGSN is connected to a TLMG, but it has not multicast group members, it receives the multicast traffic and since the SGSN has not leafs to which it could forward the multicast data, this data has to be discarded.

In case the Service Class based TLMGs are administered in each SGSN, the TLMG/Service Class combinations reflect the TLMGs that the SGSN should become part of. If the TLMG/Service Class combinations are configured in the GGSN, the Service Class can be omitted in the SGSNs.

In case not all SGSNs will register for all TLMG service class combinations, the GGSN must keep track of the registered SGSNs per TLMG/Service Class combination. This information is required to determine which SGSNs will receive the multicast traffic by means of the corresponding TLMG and which SGSNs need an additional unicast transmission connection, since these SGSNs are not part of the TLMG. This also applies when the multicast streams already arrive while not all SGSNs have done their registration.

In the following a preferred embodiment of the invention is given. It describes the Service Class Based TLMG Establishment and Release. The description is based on FIG. 8 and 9. The figures show time sequence of the sent messages between a GGSN and two SGSNs, SGSN1 and SGSN2. An arrow indicates the sent message. Above an arrow the name of the message is given and below the arrow the parameters carried by the corresponding message are listed. In the figures only the relevant parameters are shown. The boxes on the right side show the action, which is performed in a node after receiving a message. An adequate meaning of the symbols applies also to the further figures.

The sequence of FIG. 8 shows the Service Class Based TLMG Establishment when the configuration is done in the GGSN. The GGSN sends to the SGSN1 and SGSN2 the TLMG Register Request with the TLMG multicast address, TLMG-MCAddr, which is the assigned multicast address of the TLMG. Additional the QoS parameters are included in this message. As already mentioned the GTP protocol can be used for exchanging the control information. For this aim it is required to enhance the protocol by new messages. This is depicted with the prefix, New GTP. Either new messages are introduced in GTP or existing messages are updated with new and additional information. The SGSN response using IGMP protocol with the Membership Report message.

In case of a distributed configuration in the corresponding SGSNs, the TLMG Register Request message is omitted. It is also possible to use the configuration in the GGSN and SGSN. In this case the corresponding sequences can be performed simultaneously. Also the signalling in FIG. 8 can partly be done simultaneously.

Optionally, a positive or negative acknowledgement of the TLMG request message may be used in order for the GGSN to know which SGSNs support TLMGs and have become part of the TLMGs. The TLMG Register Request procedure can then also be used to negotiate TLMG related configuration parameters, such as the multiplexing procedures to be applied. General negotiation mechanisms, as for example used in PPP negotiation can be applied to agree on a common set of configuration parameters to be used for the TLMGs. The SGSNs use IGMP membership report message to register for the service class based TLMGs and become part of the TLMG delivery tree. The routing of the membership report message takes the required QoS into account.

The multiplexing of MC-traffic on a TLMG may be done in many different ways. Basically all multiplexing algorithms may be applied. If the multiplexing is not homogeneous in the network it means not all SGSNs support the same multiplexing, there may be a need for a negotiation of the multiplexing mechanism to be applied between the GGSN and SGSNs optionally, the GGSN is configured with the multiplexing capabilities of the different SGSNs. Of course, only one multiplexing variant should be used per TLMG. In case several multiplexing mechanisms can be applied, the TLMGs can additionally be based on the type of multiplexing that is applied and supported by the corresponding SGSNs. This must then be taken into account during the establishment of the pre-configured TLMGs. For example if an SGSN does not support a specific type of multiplexing, either the multiplexing is changed for the whole TLMG, a dedicated TLMG is established, or the SGSN is left out from the TLMG and a unicast session is used towards the users in that SGSN. Additionally signalling sequences can be used to query and negotiate the different configurations before the TLMGs are being established. A dedicated TLMG means a TLMG, which is established on user request without taking into consideration the pre-configured and pre-established TLMGS.

Figure 9:
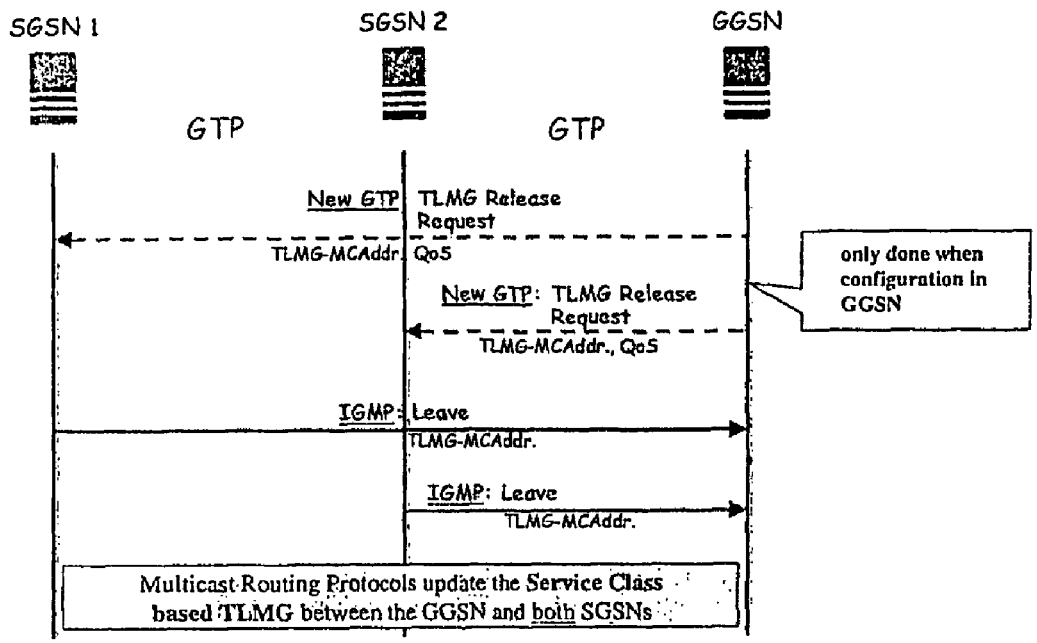
Figure 10:
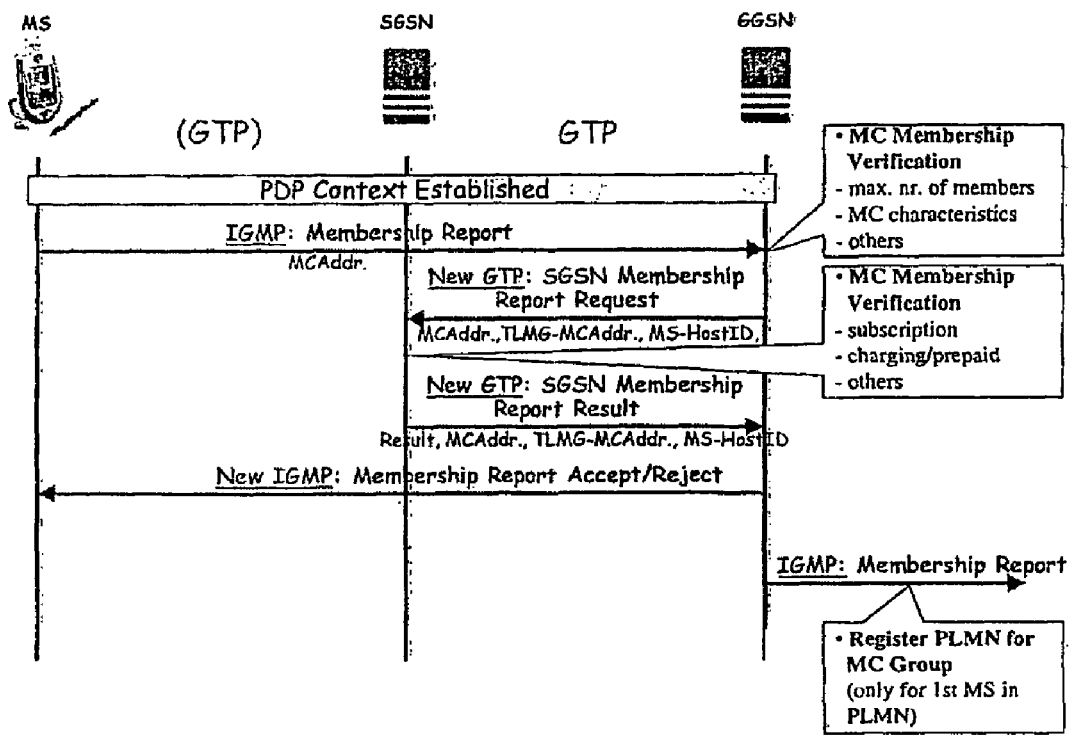

The following in respect with FIG. 9 describes the Service Class Based TLMG Release when the configuration is done in the GGSN. In this case the GGSN initiates the release by sending the TLMG Release Request to the corresponding SGSNs, SGSN1 and SGSN2. In case of a distributed configuration in the corresponding SGSNs, the TLMG Release Request message is omitted. It is also possible to use the configuration in the GGSN and SGSN simultaneously. Optionally, a positive or negative acknowledgement of the TLMG Release message may be used in order for the GGSN to know which SGSNs have been removed from the TLMGs.

The SGSNs use IGMP Leave messages to de-register from the service class based TLMGs in order to be taken out of the TLMG delivery tree. Since no explicit Leave Message exists in IGMP v1, the appropriate mechanism for leaving groups is used. In contrast to the standard IGMP membership query messages the SGSNs leave the TLMG by not sending periodically messages anymore. In order to support both IGMP version 1 and version 2, the GGSN can maintain an optional table, which reflects the IGMP versions supported by the SGSNs.

After removing of a SGSN from a TLMG, the multicast delivery tree is to be updated. This can be done by means of multicast routing protocols.

In another embodiment, in case the GGSN initiates the registration procedure, the TLMG Register Request message may indicate all possible TLMGs/Service Class combinations. The SGSN sends then a separate IGMP Membership Report message to the GGSN for the TLMGs that it would like to register for. Optionally, it may be the GGSN that orders the SGSN to register for a specific or all rLMGs.

The GGSN may decide—based on the total number of multicast group members in the PLMN, but also the number of SGSNs logically connected to the GGSN—whether TLMG is to be applied for a specific multicast group. Such decisions may be dynamic in the sense that it can change during an ongoing multicast session whenever users register or de-register for a multicast group.

In the following a preferred embodiment of the invention is given. It describes the Multicast Group Registration. The description is based on FIG. 10.

After PDP context activation, the user uses IGMP Membership Report to register for a specific multicast group in the GGSN. The GGSN acts as the local multicast router. Different from local multicast routers as specified in IGMP and MLD, the GGSN does not send out membership queries to all users with an active PDP context. This would unnecessarily waste scarce radio resources. Instead, the users initiate the joining of a multicast group by themselves. This means without being requested by a membership query message the users report their membership by means of a membership report message. Since in IGMP as specified only one member per multicast group reports the membership, the local multicast router only knows that there is at least one member for the corresponding multicast group connected to the local network. The local multicast router does not know how many members are connected and also does not know the identities of those members. However, in case each multicast group member reports its membership as described above, the GGSN or an other local multicast router, not only knows the amount of multicast group members per multicast group, but also the identities of all group members. This information can be used for efficiency, charging or statistical purposes. It is also possible to just store the number of users and the SGSNs that are part of the supported multicast group and the GGSN requests the information from the corresponding SGSNs when needed. In case the corresponding SGSNs with multicast group members are not stored, the TLMG itself may be used to multicast an All Membership Request to all affected SGSNs. The GGSN can take the number of group members into account to decide whether a TLMG is more efficient or whether it is acceptable to use replicated unicast sessions instead. The GGSN terminates the IGMP protocol and stores information about the multicast group membership of the MS.

Optionally one of the existing messages may be updated to contain a membership query. This may e.g. apply to the Router Advertisement message as specified in 3GPP TS 23.060 V3.6.0 (200-01) $3^{rd}$ Generation Partnership Project; Technical Specification Group Services and System Aspects, General Packet Radio Service (GPRS), Service Description, Stage 2 (Release 1999).

After receiving the IGMP Membership Report the GGSN optionally does a verification to determine whether the user is allowed to register for the multicast group. It may be that security checks do not allow the user to join the multicast group or that the operator does not allow the multicast group registration because of the characteristics of the group or that the maximum number of allowed multicast group members has been reached. Several other checks may be performed in the GGSN. In case of unsuccessful results, the GGSN sends a Membership Report Reject message back to the user and does not continue with the sequence as described below. Optionally, the GGSN can send instead of a Membership Report Reject message an ICMP error message back to the user.

To be able to determine whether hosts are part of closed groups or not, an administration may be used in the GGSN or the GGSN can have an external interface to a server or database that administers the multicast groups.

The GGSN informs the corresponding SGSN that it has mobile stations registered for a multicast group. A new GTP message is used for that, SGSN Membership Report Request. It is also possible to use an enhanced PDU notification message for this purpose. PDU notifications are GTP messages and specified in e.g. TS 29.060. 3GPP TS 29.060 V.4.0.0 (2001-03) 3rd Generation Partnership Project; Technical Specification Group Core Network; General Packet Radio Service (GPRS); GPRS Tunneling Protocol (GTP) across the Gn and Gp Interface (Release 4).

After the TLMG establishment procedure, as described in respect to FIG. 8 a number of pre-configured TLMGs are established in the core network, where the GGSN is the root and the SGSNs are leafs of the tree. External multicast traffic is transported, using the TLMGs in the core network to the users. If a number of multicast groups are multiplexed onto one TLMG, a de-multiplexing identifier is needed. In the figure below, the Multicast Address, which is the Multicast address of the external multicast group received over the Gi interface McAddr, is used for de-multiplexing in the SGSN. Therefore the McAddr is sent as parameter in the SGSN Membership Report Request message. If no multiplexing mechanism is used for the TLMGs only one Multicast-group is mapped onto one TLMG. Additional, the TLMG-MCAddr, which is the Multicast IP Address of the TLMG, is transmitted with the new GTP message SGSN Membership Report Request. The use of TLMG-MC Address in the SGSN is optional and is therefore optional in the message, too. Also the Host ID of the user, MS-HostID that registered for the Multicast Group is sent with this message as parameter.

In fact, for the multicast group traffic the GGSN ignores the tunnel that is already established for that MS by the SGSN during the PDP context activation and rather uses pre-configured multicast delivery tree.

After receiving the SGSN Membership Report Request message the SGSN makes Multicast Group MC Membership Verification. In particular it means that the SGSN can do subscription check or charging accounts check to determine whether the mobile station is allowed to register for any or for this specific multicast group. The result of the verification is included in SGSN Membership Report Result message. In case of a negative verification result, the SGSN will return a SGSN Membership Report Result message, which can be accompanied by a cause indication in case of a negative result, back to the GGSN, indicating that the multicast verification has not been successful and that the mobile station should not join the multicast group. In case of a positive verification result, this message indicates a successful outcome to the GGSN. Furthermore, the SGSN then stores the relation between the MCAddr and the MS-HostID by for example simply adding the Multicast Address to the existing PDP-context information for that user to be able to replicate the data and forward these to the corresponding hosts at reception of the multicast data stream. Optionally, the TLMG-Address of the used TLMG is stored, too.

Since the TLMGs are pre-established, the dynamic update and verification of SGSNs, which are members of the TLMG, may be omitted.

Upon receipt of the SGSN Membership Report Result, the GGSN returns a Membership Report Accept or Membership Report Reject to the mobile station, possibly containing a cause indication, depending on the outcome of the verification. Optionally, the GGSN returns nothing in case of a successful verification procedure, and an IGMP error message in case of a negative result of the verification.

In case of a successful SGSM Membership Report Result, the counter for the number of users for the multicast group is stepped and/or the MS-HostID is added to the multicast group or respectively to TLMG.

The GGSN takes care of the multicast membership propagation via the backbone network over the Gi-interface by for example sending the IGMP Membership Report. The membership propagation to neighbouring routers is only required to indicate that there is at least one member of the corresponding multicast group in the local network, for example PLMN, which wants to receive multicast data. Therefore this propagation is only required for the first multicast group member within the PLMN. Thus, if a multicast group is unknown at the GGSN, the GGSN propagates the membership report message via the Gi interface to the next Multicast router to join the multicast group and to receive and forward the multicast traffic to the MSes in the PLMN that are part of the multicast group. The GGSN knows whether it should propagate the message on the Gi-interface from the counter for the number of users for a multicast group or the actual number of MS-HostIDs.

In the following a preferred embodiment of the invention is given. It describes the Multicast Group De-Registration and TLMG Release in respect to FIG. 11.

As described before no periodic Membership Query messages are sent to all users with an active PDP context. In IGMP v1 the local multicast router determines whether there are still members left for a multicast group on the LAN by periodically multicasting membership query messages. In IGMP v2 a Leave Message has been defined to reduce the latency of leaving members.

Figure 11:
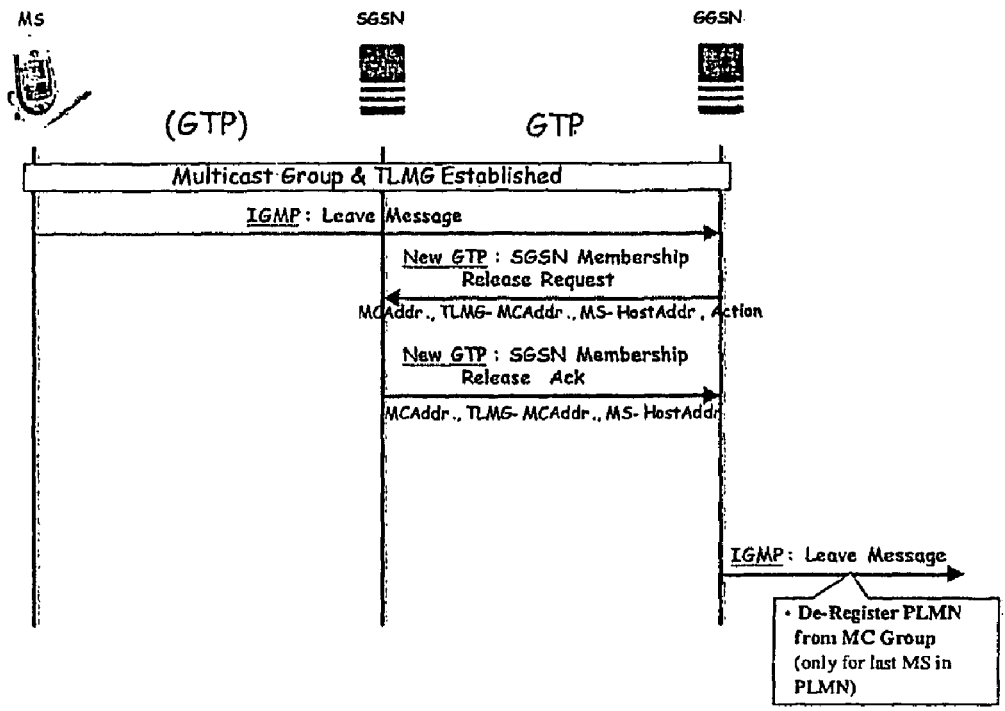

In respect to FIG. 11 at the reception of the IGMP-Leave Message from the mobile station, the GGSN performs the basic checks, for example it checks whether the mobile station was part of the multicast group. The GGSN then sends a new GTP message, the SGSN, Membership Request Release, to the SGSN to request the membership release for that mobile station. This message carries as parameter the TLMG MCAddr and the address of the mobile station, MS-HostID. The SGSN confirms the release by sending an optional acknowledge message, SGSN Membership Release ACK back to the GGSN and removes the mobile station from the list for the corresponding TLMG. Also the GGSN removes the mobile station from the list for the corresponding multicast address or just decreases the corresponding counter.

Optionally, the GGSN may decide that the number of multicast group members in that SGSN does not justify the use of a multicast delivery tree towards that SGSN and that the SGSN is to be de-registered from the TLMG. This is indicated by the optional information element Action from the GGSN towards the SGSN. The parameter Action is optional. It should be used for optimising the data delivery. Using this parameter, the message can be used in case of overload situations in the GGSN.

In case the GGSN determines that the last multicast group member in the PLMN has de-registered from the multicast group, this information is propagated towards the neighbouring routers over the Gi-interface. In case IGMP v2 or a later version is used, the GGSN sends an IGMP leave message. Otherwise, the GGSN just does not refresh the multicast group membership on the Gi-interface any longer.

In the following a preferred embodiment of the invention is given. It describes PDP Context Deactivation in respect to FIG. 12.

The SGSN and/or the GGSN initiate a PDP Context Deactivation. The PDP Context Deactivation contains two signalling messages, the Delete PDP Context Request and the Delete PDP Context Response. The node, which initiates the deactivation, sends the Delete PDP Context Request and as an answer it receives the Delete PDP Context Response. This procedure is detailed described in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998) and in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999).

After the performed PDP Context Deactivation the same procedure with the corresponding signalling messages as for the multicast group de-registration is applied. The SGSN checks whether the mobile station was part of one or more TLMGs. Accordingly to the result the mobile station is removed from the TLMG or from the corresponding TLMGs. The SGSN possibly de-registers itself from the TLMG or TLMGs, depending on whether this was the last mobile station for the corresponding TLMG or TLMGs.

Figure 12:
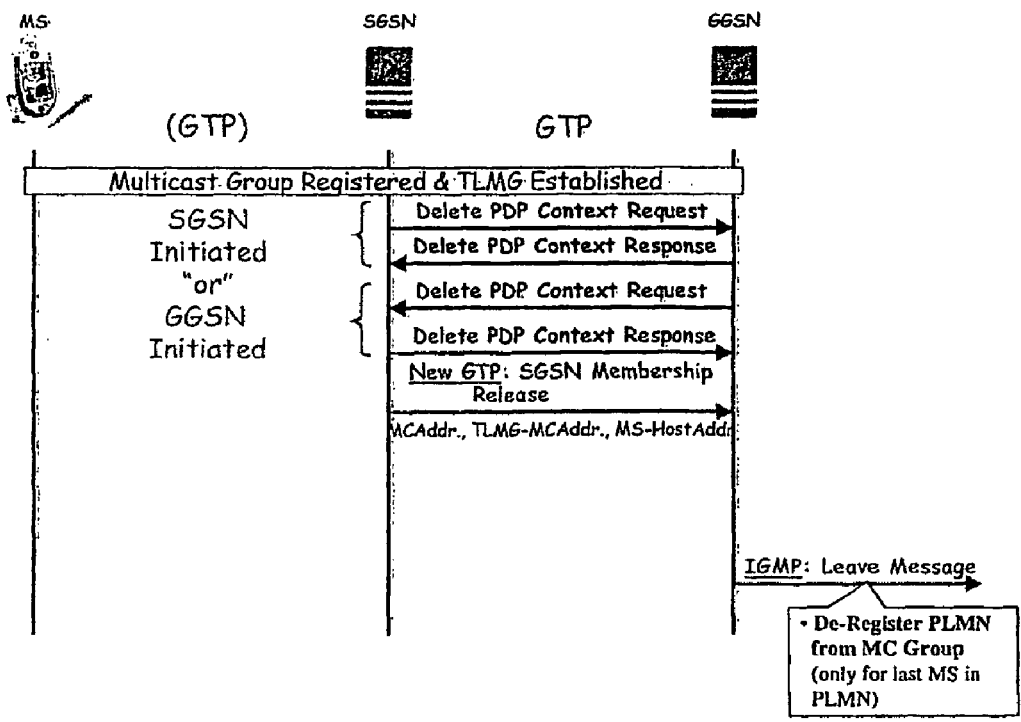
Figure 13:
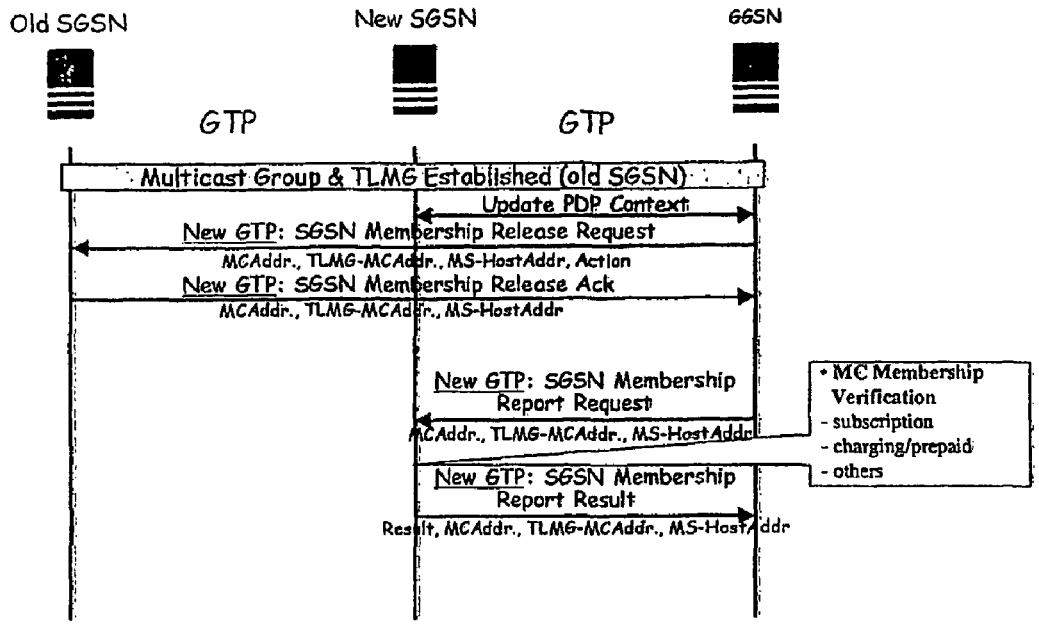

If the GGSN has all MS-HostIDs stored per multicast-group or respectively per TLMG, so-called MC-group/TLMG, it can check itself whether the mobile station is part of one or more multicast groups and act accordingly. Otherwise, the SGSN either informs the GGSN in the Delete PDP Context Request or Delete PDP Context Response message by means of new information elements specifying the MS-HostID and the MulticastGroup/TLMG or a new message is used from the SGSN to the GGSN with the same information elements as shown in FIG. 12 with SGSN Membership Release. This message could still be used if the GGSN has the MS-HostIDs stored per MC-group/TLMG. Since the TLMG is optional in the SGSN, it is also optional in the SGSN Membership Release message.

At reception of the SGSN Membership Release message or similar as discussed above, the same handling applies as described for the multicast group de-registration sequences described before. After the PDP Context Deactivation the same handling applies as for the multicast group de-registration by using the IGMP Leave Message as described before. The SGSN checks whether the MS was part of one or more Multicast groups. If yes, the MS is removed from the multicast group or groups.

In the following a preferred embodiment of the invention is given. It describes the procedure, when a mobile station changes the serving SGSN area.

In case a mobile station changes the serving SGSN, the multicasting information stored in the SGSN and GGSN must be changed and adapted accordingly and the TLMG may have to be updated.

As described in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998) and in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999), an MS can change the serving SGSN due to a GPRS Attach, due to the Inter SGSN Routing Area Update or due to the Serving Radio Network Subsystem relocation.

The GPRS Attach is described in section 6.5.3 in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999), the Inter SGSN Routing Area Update in section 6.9.1.2.2 in the same document, including the Inter SGSN Inter System Change in section 6.13.2. The Serving SRNS Relocation is to be found in section 6.9.2.2.1 of the above-mentioned reference.

However the GPRS Attach case does not need to be considered for multicasting, since the mobile station will not be registered for a multicast group when invoking this procedure. The reason for it is that the mobile station is already de-registered from the corresponding multicast groups because of the performed PDP-context deleting.

In case of an Inter SGSN Routing Area Update or Serving SRNS Relocation the new SGSN sends an Update PDP Context Request to the GGSN.

There are three basic alternatives for taking care of the multicast administrations in the SGSNs and GGSN in case the SGSN is changed for a multicast group member.

In the first alternative the Multicast Group De-Registration and TLMG Release for the old SGSN and the Multicast Group Registration and TLMG Establishment for the new SGSN procedures as they are described above are combined. The following description is based on FIG. 10.

Similar to the PDP context deactivation described above, the SGSN may have to indicate to the GGSN that the mobile station is part of a multicast-group by a modified Update PDP Context message signalling. In this sequence the GGSN must be informed about the identifier of TLMG. It is the task of the GGSN to inform the old and the new SGSN about the changes. Old SGSN means the SGSN, where a mobile station was registered and new SGSN is the SGSN, by which a mobile station is being currently handled. The old SGSN is informed by the means of the SGSN Membership Release Request message. As an acknowledgement for the performed SGSN change the old SGSN sends a SGSN Membership Release Ack. In case the old SGSN released the last mobile station an IGMP Leave message it sent.

The Multicast membership verification in the new SGSN is optional. The GGSN may use an additional indicator in the SGSN Membership Report Request message to specify whether these checks are to be done or not. If no checks are done, it is enough to report back an acknowledgement to the GGSN by sending the SGSN Membership Report Result or to have no reporting back to the GGSN at all in case of reliable communication. In case additional Multicast membership verification is done the GGSN may have to send a negative result back to the mobile station. In that case the SGSN may have to de-register from the TLMG and the PLMN may have to de-register from the multicast group. These message sequences are not shown in the FIG. 13.

Figure 14:
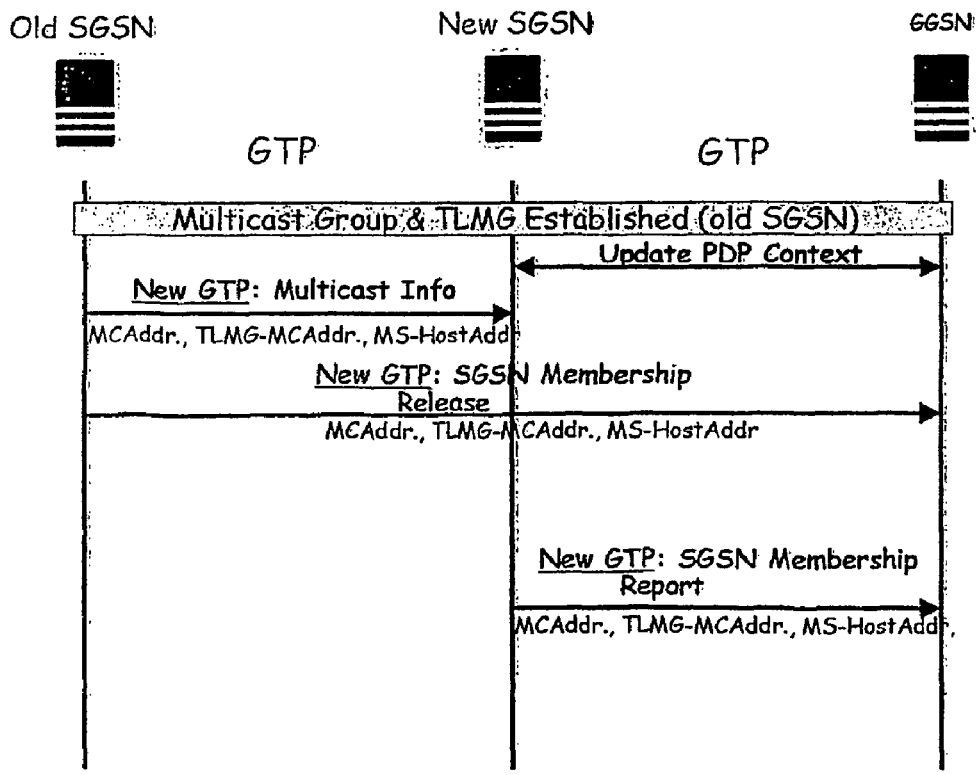

In the second alternative the multicast group information is directly transferred from the old to the new SGSN by sending a Multicast Info message after the performed Update PDP Context as it is also disclosed in FIG. 14. The old SGSN initiates by means of the SGSN Membership Release the deleting of its entries in the GGSN. Subsequently an IGMP Leave message is sent. The SGSN may optionally do verification and depending on the outcome, refrain from sending an SGSN Membership report to the GGSN. The SGSN would in that case report to the GGSN that a reject message is to be sent to the mobile station. Therefore also here the same principles as for the first alternative can be applied.

Figure 15:
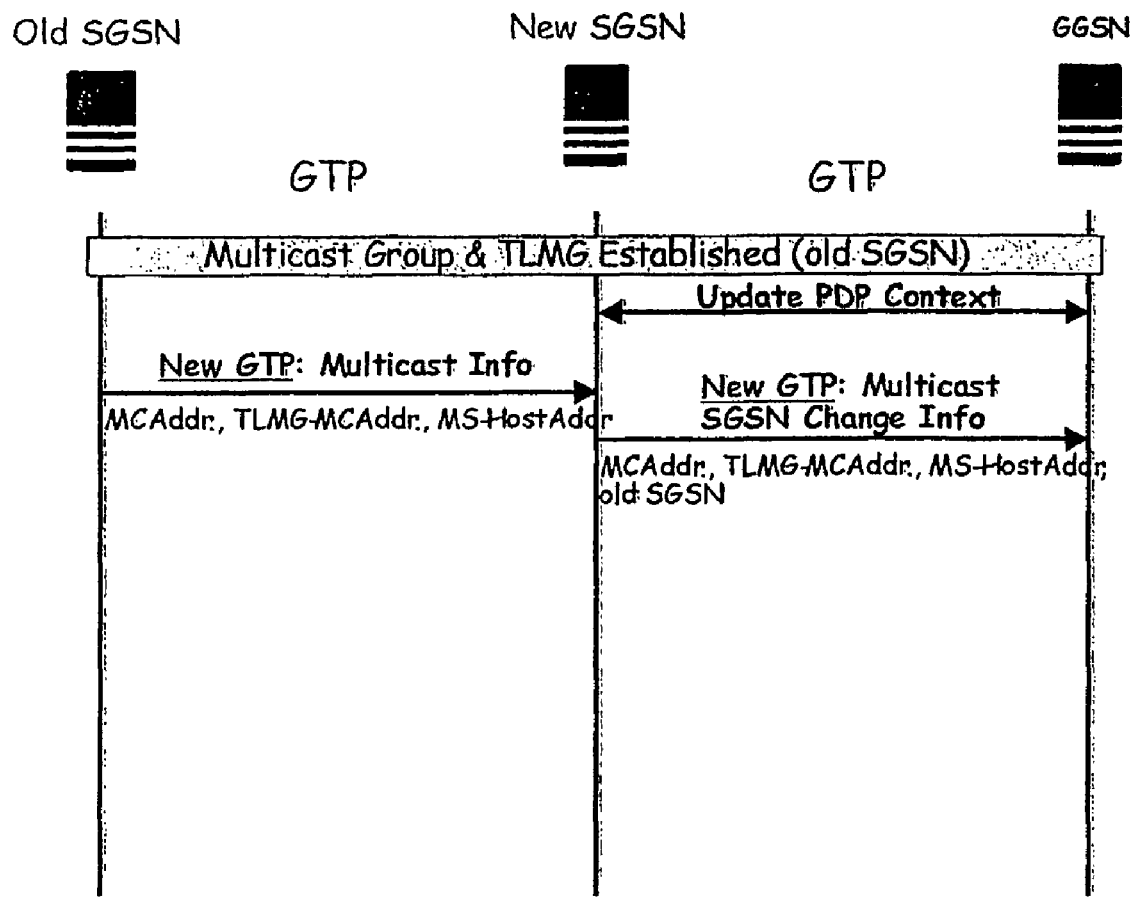

The third alternative discloses a shortcut solution where the new SGSN after receiving the Multicast Info message from the old SGSN sends an update message, the Nulticast SGSN Change Info to GGSN in order to update the multicast entries in the old and the new SGSN at the GGSN. This exchange of signalling messages is also shown in FIG. 15.

Finally in all three alternatives, the TLMG is updated, for both the old and new SGSN by means of the multicast routing protocols.

In alternatives two and three the multicast info transfer from the old to the new SGSN may also be done before sending the Update PDP Context between the new SGSN and the GGSN. The Update PDP Context message exchange may be also extended with the multicast info.

In all three alternatives an additional message may be sent to the mobile station in case the in the new SGSN performed check do not accept the multicast group membership. This may for example apply when the new SGSN does not support the multicast routing protocols or does not support the multicast info exchange messages or information elements like for example multi-vendor environment. The MS is then ordered to send an IGMP Leave message to the GGSN in order to de-register.

In the following the multiplexing of the multicast streams data on TLMG is described.

By using a limited number of TLMGs for all multicast group traffic arriving on the Gi-interface, the multicast streams are implicitly multiplexed in the core network. There are several alternatives to multiplex the multicast streams on the pre-configured TLMGs. The described multiplexing can also be applied in case the TLMGs are not-pre-configured, but rather established on demand.

In the following merely a few alternatives for performing the multiplexing are presented.

Since the multicasting in the core network is based on PLMN specific multicast addresses, the original multicast destination address in the IP packet header is to be replaced. The original IP multicast address is added as a private extension header to the IP packet header.

With IPv6 it is possible then an additional routing header can simply be added by specifying IP as next header in the IP header field. This IP address in the routing header is then again an IP-Multicast address, this means this is the original IP multicast address received on the Gi-interface.

De-multiplexing is done in the SGSN by the destination Multicast Address or Port. According to the port number in the IP header different applications can be distinguished. This means that multiple multicast data streams belonging to the same destination address but designated to different application can be multiplexed on the same TLMG and the distinguishing of the streams is done by means of the port address. For this aim the SGSN needs to maintain a table of corresponding multicast address or port to mobile station identities.

In the other alternative the GTP Tunnelling ID TID can be used for de-multiplexing the multicast streams in the SGSN. In that case, an enhanced version of GTP-U, as described in Digital cellular telecommunications system (Phase 2+); General Packet Radio Service (GPRS); Point To Multipoint-Multicast Service Description; Stage 2; GSM 03.61, 15 Jan. 1997, Version 0.7.1 is used. The SGSN needs to maintain a table of associations between TID and mobile station identities. If this alternative is used, the multicast address is to be replaced by the TID. The signalling sequences need to be updated to reflect the sending of the TID instead of the multicast address.

In the following a preferred embodiment of the invention is given. It describes the Multicast Data Delivery procedure in respect to FIG. 16.

Figure 16:
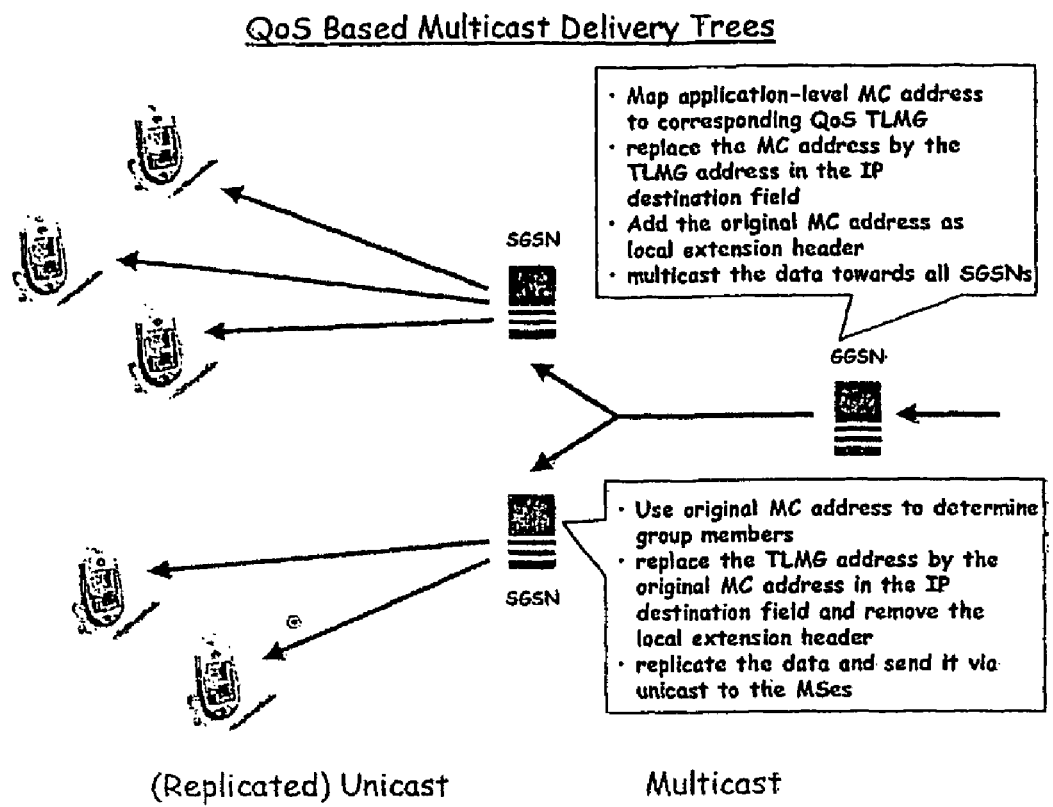

The FIG. 16 shows a scenario where multicast data is received at the GGSN and forwarded via the TLMG to two SGSNs that each have multiple group members connected.

Since multiple TLMGs may exist for each UMTS service class, the original multicast address must be carried in the multicast stream that is transported via the TLMG to the SGSNs as described before. This original multicast address is needed to de-multiplex the different multicast flows on one TLMG in the SGSN. The GGSN determines the TLMG to be used for a specific multicast session by considering one or more of the following criteria. For example the required QoS as indicated in the multicast stream received on the Gi-interface for example according to the Type of Service bits in IP header are considered. The required QoS can also be indicated by an external entity such as a Policy Enforcement Point, Policy Decision Point or Cell State Control Function (CSCF). Further the configuration of required service class for default or known multicast addresses could be taken into account.

At reception of the multicast data stream, the GGSN looks in its tables for the TLMG address belonging to the application level multicast address. The required QoS is taken into account for this lookup if applicable. The GGSN then changes the IP destination address to the TLMG multicast address, adds the original multicast address as an extension to the IP packet header and multicasts the data to all SGSNs that are part of the TLMG. In case one of the other multiplexing mechanisms as described above is used, the encapsulation of the original IP multicast address is done differently.

At reception of the TLMG multicast data in an SGSN, this SGSN takes the original IP multicast address as specified in the IP destination address field or the TLMG and uses this for a table lookup to identify the corresponding multicast group members. The IP destination address is changed back to this original multicast address. The SGSN then replicates the data and uses unicast transmission or alternatively also multicast technology to forward the data via the radio access network to the mobile stations. If the SGSN does not have any group members for the multicast group, it ignores the multicast data.

In the following embodiments are presented, in which the serving node, like for example an SGSN decides to be part of a TLMG.

Optionally, SGSNs collect statistics about the number of multicast data packets that they relay towards MSes and the number of multicast data packets that they discard, because there are no mobile stations in that SGSN that are part of the corresponding multicast group. Based on this information the SGSN may decide to de-register from the TLMG, since it requires more processing capacity from the SGSN to discard multicast traffic than is gained from the multiplexing. The GGSN must then store a list of SGSNs that are not part of the TLMGs, since these will not receive the multicast traffic but must be served by replicating the multicast traffic in the GGSN and use unicast transmission towards these SGSNs instead.

The multicast ratio evaluation provides an example, in which the SGSN decides to be part of TLMGs. Other examples are TLMGs that are based on geographical co-ordinates. This means a TLMG spanning all SGSNs that cover a certain geographical area, for example a part of a country or a city. Such TLMGs may be used to provide multicast services related to the geographical coordinates like for example weather forecasts, traffic information or entertainment information.

The above described pre-configured TLMGs and corresponding multicast delivery trees can also be used to enable broadcast services within UMTS. Since broadcasting on network level should be avoided because all nodes and not only the ones interested receive the broadcast content. In case of multiservice backbone networks, which are used by multiple service providers it should be avoided that all nodes receive the content.

Dedicated TLMG registration security procedure refers to the case where each node can register to a TLMG. In that case a dedicated security procedure may be required for each node registration. In case of a pre-configured TLMG, the whole TLMG can be secured in one step, automatically when configuration is performed in the GGSN for example.

The pre-configured TLMG concept enables also multicast and broadcast services to a dedicated group of nodes in the network. Especially, on the Gp-interface, broadcasting or multicasting of relevant information, like for example configuration, administration may be handled economically by means of TLMGs.

For each data stream to be broadcasted, one pre-configured TLMG is established or chosen, which includes all SGSNs that are connected to a GGSN.

This invention disclosure describes the solution for GPRS/UMTS. However, it should be understood that the same mechanisms could be applied for example to create a multicast transport group for point-to-multipoint streaming with RTSP or conversational multimedia services with SIP.

The solutions described in this invention merely cover the information exchange between the different network entities. It should be understood that the data storage may be distributed in different ways and that other messages may be used as carrier for the same or different information.

In the messages in the described signalling sequences, some of the information elements may be omitted when a connection-oriented approach is being used. Furthermore, instead of several dedicated new for example GTP messages, a common message with an additional activity code may be used instead.

The signalling sequences in this report are based on reliable transmission. In case of unreliable transmission, the sequences must be adapted accordingly, it means by adding confirmation or acknowledge messages.

Further the solution covered in this invention focuses on the packet switched domain in GSM or UMTS network. In general, the idea can be applied whenever tunnelling is used, such as with GTP, L2TP, IPSec, Mobile IP, etc. Therefore the invention can be applied to networks with two IP layers, it means an application IP layer and a transport IP layer. Also for case where the transport layer is based on another technology that supports multicast transmission for example ATM the mechanisms can be applied.

The invention claimed is:

1. A method for performing a multicast transmission of multicast data streams of multicast groups in a telecommunication network having at least one router and at least one serving node handling at least one user and providing a protocol stack having an application IP layer used for performing said multicast transmission of multicast data in at least one multicast group wherein said application IP layer is located above a point-to-point-layer, wherein
said method includes the following steps
a pre-configured transport level multicast group tunnel is pre-established by means of transport layer protocol for tunnelling on the transport layer, located below the point-to-point layer, providing a point-to-multipoint connection and said tunnel is assigned to the multicast group between the router and the serving node redirecting the multicast transmission from the application IP layer to the transport layer,
the router is adapted to multiplex the multiple multicast data streams matching with the pre-configuration onto the pre-configured transport level multicast group tunnel, and
transmission of multicast data is routed over the pre-configured transport level multicast group tunnel from the router to the at least one serving node and,
the serving node is adapted to de-multiplex multicast data streams received on the pre-configured transport level multicast group tunnel and,
transmission of multicast data streams is performed from the serving node to the at least one user registered to the multicast group.

2. The method according to claim 1, wherein if there are more then one user registered to the multicast group a replication of the multicast data streams is performed in the serving node.

3. The method according to claim 1 wherein the pre-configuration of the transport level multicast group tunnel is done according to different service classes.

4. The method according to claim 1, wherein the pre-configuration considers the different geographical regions.

5. The method according to claim 1, wherein the serving node informs the router about its interest for connection or release to or from a pre-configured transport level multicast group.

6. The method according to claim 1 wherein the router administrates by means of an administration interface the serving nodes that are to be connected or released to a pre-configured transport level multicast group tunnel.

7. The method according to claim 1 wherein between the router and at least one serving node a pre-configured multicast delivery tree is created.

8. The method according to claim 7, wherein pre-configured multicast delivery tree is established by means of multicast routing protocols.

9. The method according to claim 1 wherein if multiple multicast groups belong to the same service class, multiplexing of these multiple multicast groups is performed on the same pre-configured transport level multicast group tunnel supporting said service class.

10. The method according to claim 1, wherein a data structure for the administration of the association between the pre-configured transport level multicast groups, the registered user for the multicast group and multicast address of the multicast group is either distributed within the point-to-point oriented network or centralised.

11. The method according to claim 1 wherein the data structure is administrated in the router and/or in the serving nodes.

12. The method according to claim 9 wherein the data structure includes the relation between the pre-configured transport level multicast group tunnel and the service class.

13. The method according to claim 1 wherein the serving node collects statistics about the number of multicast data packets that they relay towards users and the number of multicast data packets that they discard and according to the result a decision is taken to de-register from a pre-configured transport level multicast group.

14. The method according to claim 1 wherein the router administrates the number of the registered serving nodes.

15. The method according to claim 1, whereby in order to de-multiplex the receiving multiplexed multiple data streams on the same pre-configured transport level multicast group tunnel, the serving node administrates a list of served multicast group with the registered users.

16. The method according to claim 1 wherein in order to perform registration or de-registration of a user to or from a multicast group, the user informs the router, the router informs the serving node and an updating of the corresponding entries in the data structure is performed.

17. The method according to claim 1 wherein the user changes the serving nodes, a registration of the user to the new serving node, deleting from the old serving node and update of the corresponding entries in the router are performed.

18. The method according to claim 1 wherein the transport layer protocol for tunnelling is a control signalling protocol.

19. The method according to claim 1 wherein in order to establish and release the pre-configured transport level multicast group tunnel messages of the control signalling protocol are exchanged.

20. The method according to claim 1 wherein the control signalling protocol is a GTP Protocol.

21. The method according to claim 1 wherein a GTP Tunnelling ID TID is used for de-multiplexing the multicast streams in the serving node.

22. The method according to claim 1 wherein the multicast is an IP-multicast using IP packets with IP multicast address.

23. The method according to claim 1 wherein the indication of registration to and release from a multicast group is done by means of IGMP or MLD protocol.

24. A router for performing a multicast transmission of multicast data streams of multicast groups in a telecommunication network, the network having at least one of said router and at least one serving node handling at least one mobile station, said router comprising:
a microprocessor;
a main memory coupled to the microprocessor; and
persistent storage, associated with the microprocessor, the microprocessor executing instructions for:
establishing a pre-configured transport level multicast group tunnel between the router and at least one serving node utilizing a transport layer protocol for tunnelling on the pre-configured transport layer, located below a point-to-point layer, providing a point-to-multipoint connection towards the at least one serving node,
multiplexing multiple multicast data streams onto the pre-configured transport level multicast group tunnel, and
transporting the multicast data over the pre-configured transport multicast group tunnel to the at least one serving node wherein said router uses an application IP layer for performing said multicast transmission of multicast data in at least one multicast group, said application IP layer being situated above the point to point layer.

25. The router according to claim 24 wherein the router controls a data structure for the administration of the relation between the pre-configured transport level multicast group tunnel, the registered users for the multicast group and a multicast address of the multicast group.

26. A serving node for performing a multicast transmission of multicast data streams of multicast groups in a telecommunication network, the network having at least one router and at least one said serving node handling at least one mobile station, the serving node comprising:
a microprocessor;
a main memory coupled to the microprocessor; and
persistent storage, associated with the microprocessor, the microprocessor executing instructions for:
receiving multicast data streams from the at least one router on the pre-configured transport multicast group tunnel,
administering the pre-configured transport level multicast group tunnel and of the at least one mobile station registered to the corresponding multicast group,
de-multiplexing the multicast data streams multiplexed on the pre-configured transport level multicast group tunnel and,
replicating the received multicast data streams among the users registered to the corresponding multicast group wherein said serving node uses an application IP layer for performing said multicast transmission of multicast data in at least one multicast group, said application IP layer being situated above the point to point layer.

* * * * *

UNITED STATES PATENT AND TRADEMARK OFFICE
CERTIFICATE OF CORRECTION

| | |
|---|---|
| PATENT NO. | : 8,098,618 B2 |
| APPLICATION NO. | : 10/481078 |
| DATED | : January 17, 2012 |
| INVENTOR(S) | : Hundscheidt et al. |

It is certified that error appears in the above-identified patent and that said Letters Patent is hereby corrected as shown below:

In Column 1, Line 62, delete "MLDcorrespond" and insert -- MLD correspond --, therefor.

In Column 2, Line 54, delete "Communication" and insert -- Telecommunications --, therefor.

In Column 4, Line 46, delete "(session" and insert -- (Session --, therefor.

In Column 5, Line 21, delete "then" and insert -- than --, therefor.

In Column 8, Line 3, delete "then" and insert -- than --, therefor.

In Column 9, Line 21, delete "Tu-PS" and insert -- Iu-PS --, therefor.

In Column 10, Line 11, delete "means" and insert -- means, --, therefor.

In Column 10, Line 49, delete "TLMGS." and insert -- TLMGs. --, therefor.

In Column 11, Line 62, delete "tlmgs" and insert -- TLMGs --, therefor.

In Column 11, Line 66, delete "ascertain" and insert -- a certain --, therefor.

In Column 11, Line 66, delete "tlmg." and insert -- TLMG. --, therefor.

In Column 12, Line 33, delete "tlmg" and insert -- TLMG --, therefor.

In Column 13, Lines 56-57, delete "SGSNs optionally," and insert -- SGSNs. Optionally, --, therefor.

In Column 14, Line 6, delete "TLMGS." and insert -- TLMGs. --, therefor.

In Column 14, Line 37, delete "rLMGs." and insert -- TLMGs. --, therefor.

Signed and Sealed this
Twenty-ninth Day of May, 2012

David J. Kappos
*Director of the United States Patent and Trademark Office*

CERTIFICATE OF CORRECTION (continued)
U.S. Pat. No. 8,098,618 B2

In Column 15, Line 19, delete "(200-01)" and insert -- (2001-01) --, therefor.

In Column 15, Line 35, delete "ICMP" and insert -- IGMP --, therefor.

In Column 16, Line 40, delete "SGSM" and insert -- SGSN --, therefor.

In Column 17, Line 8, delete "SGSN," and insert -- SGSN --, therefor.

In Column 19, Line 38, delete "Nulticast" and insert -- Multicast --, therefor.

In Column 19, Line 66, delete "not-pre-configured," and insert -- not pre-configured, --, therefor.

In Column 20, Lines 27-28, delete "Multipoint-Multicast" and insert -- Multipoint Multicast --, therefor.

In Column 20, Line 52, delete "Cell" and insert -- Call --, therefor.

In Column 22, Line 28, in Claim 1, delete "point-to-point-layer," and insert -- point-to-point layer, --, therefor.

In Column 22, Line 52, in Claim 2, delete "then" and insert -- than --, therefor.